(12) United States Patent
Tokuda et al.

(10) Patent No.: US 10,328,849 B2
(45) Date of Patent: Jun. 25, 2019

(54) COLLISION AVOIDANCE APPARATUS FOR NOTIFICATION OF COLLISION AVOIDANCE DIRECTION

(71) Applicant: DENSO CORPORATION, Kariya, Aichi-pref. (JP)

(72) Inventors: Tetsuya Tokuda, Kariya (JP); Takeshi Miura, Kariya (JP); Yasuhiko Mukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/574,803

(22) PCT Filed: May 17, 2016

(86) PCT No.: PCT/JP2016/064579
§ 371 (c)(1),
(2) Date: Nov. 16, 2017

(87) PCT Pub. No.: WO2016/186105
PCT Pub. Date: Nov. 24, 2016

(65) Prior Publication Data
US 2018/0141492 A1 May 24, 2018

(30) Foreign Application Priority Data
May 18, 2015 (JP) .................. 2015-101177

(51) Int. Cl.
*B60Q 1/00* (2006.01)
*B60Q 1/52* (2006.01)
*B60T 7/12* (2006.01)
*B60T 8/1755* (2006.01)
*B60W 30/09* (2012.01)
*B60Q 9/00* (2006.01)
*B60W 30/095* (2012.01)
*G06K 9/00* (2006.01)
*G08G 1/16* (2006.01)
(Continued)

(52) U.S. Cl.
CPC ............. *B60Q 1/525* (2013.01); *B60Q 1/00* (2013.01); *B60Q 9/008* (2013.01); *B60T 7/12* (2013.01);
(Continued)

(58) Field of Classification Search
USPC ........................................ 340/436
See application file for complete search history.

(56) References Cited

U.S. PATENT DOCUMENTS 8,977,007 B1 * 3/2015 Ferguson ........... G06K 9/00825
340/988
2008/0084286 A1 4/2008 Teramura et al.
(Continued)

FOREIGN PATENT DOCUMENTS

JP 2000-318513 A 11/2000
JP 2002-274344 A 9/2002
(Continued)

*Primary Examiner* — Kerri L McNally
(74) *Attorney, Agent, or Firm* — Knobbe, Martens, Olson & Bear, LLP

(57) ABSTRACT

A collision avoidance apparatus provided with object recognition means, collision determination means, and notification means. The object recognition means identifies an object around an own vehicle. The collision determination means determines the possibility of a collision between an object identified by the object recognition means and the own vehicle. The notification means notifies the outside of the own vehicle about the movement direction of the vehicle if the collision determination means determines that the target object is an object having the potential for collision with the own vehicle.

12 Claims, 2 Drawing Sheets

(51) Int. Cl.
*B60W 30/08* (2012.01)
*B60W 40/10* (2012.01)
*B60T 7/22* (2006.01)

(52) U.S. Cl.
CPC ........ *B60T 8/1755* (2013.01); *B60T 8/17558* (2013.01); *B60W 30/08* (2013.01); *B60W 30/09* (2013.01); *B60W 30/0956* (2013.01); *B60W 40/10* (2013.01); *G06K 9/00791* (2013.01); *G06K 9/00805* (2013.01); *G08G 1/162* (2013.01); *G08G 1/166* (2013.01); *B60T 7/22* (2013.01); *B60T 2201/022* (2013.01)

(56) References Cited

U.S. PATENT DOCUMENTS

| | | | |
|---|---|---|---|
| 2008/0087286 A1 | 4/2008 | Jones | |
| 2011/0199199 A1* | 8/2011 | Perkins | B60Q 1/506 340/435 |
| 2011/0215947 A1* | 9/2011 | Ekmark | G08G 1/163 340/902 |
| 2015/0091715 A1* | 4/2015 | Nomura | G08G 1/166 340/435 |
| 2015/0145701 A1* | 5/2015 | Beggs | B60Q 1/2673 340/944 |
| 2015/0166062 A1* | 6/2015 | Johnson | B60W 30/12 701/41 |

FOREIGN PATENT DOCUMENTS

| | | |
|---|---|---|
| JP | 2003-095046 A | 4/2003 |
| JP | 2003-346297 A | 12/2003 |
| JP | 2005-247004 A | 9/2005 |
| JP | 2006-031443 A | 2/2006 |
| JP | 2006-209325 A | 8/2006 |
| JP | 2008-094151 A | 4/2008 |
| JP | 2012-238080 A | 12/2012 |
| WO | 2007-023899 A1 | 3/2007 |

* cited by examiner

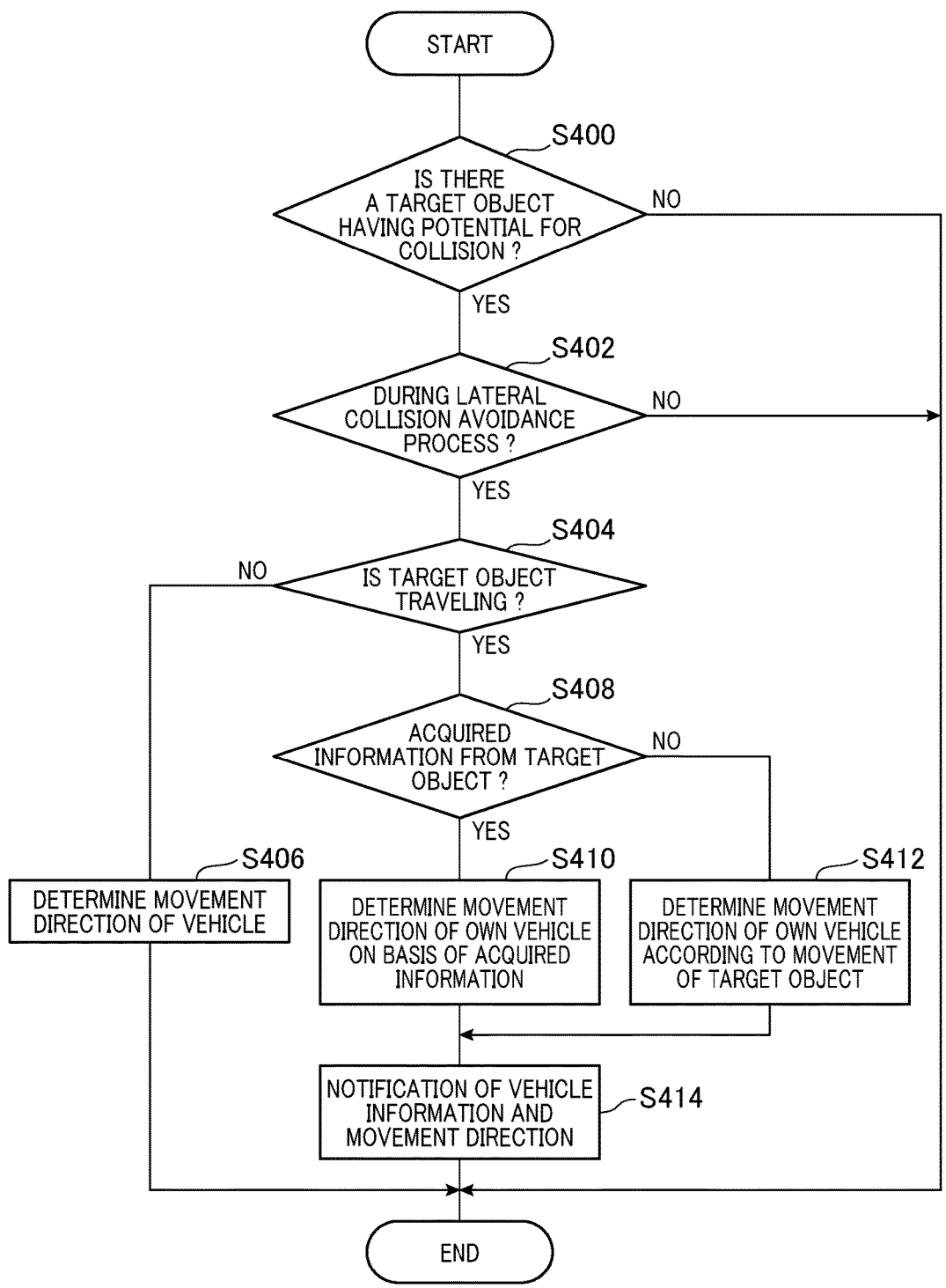

COLLISION AVOIDANCE APPARATUS FOR NOTIFICATION OF COLLISION AVOIDANCE DIRECTION

CROSS-REFERENCE TO RELATED APPLICATION

This application is based on and claims the benefit of priority from earlier Japanese Patent Application No. 2015-101177 filed May 18, 2015, the description of which is incorporated herein by reference.

BACKGROUND OF THE INVENTION

Technical Field

The present disclosure relates to a collision avoidance apparatus. In more detail, the present disclosure relates to a collision avoidance apparatus that uses the technology for avoiding a collision between an own vehicle and an object around the own vehicle.

Background Art

Recently, a collision avoidance apparatuses are known. For example, JP-A 2002-274344 discloses the technology for performing collision avoidance process which automatically and appropriately allocates four-wheel drive and improves the turning characteristics at the time of avoidance traveling, if it is judged that a collision cannot be avoided by only the braking force when avoiding a collision with an object around the own vehicle.

CITATION LIST

Patent Literature

[PTL 1] JP-A 2002-274344

When an object in the range having the potential for a collision with the own vehicle is another vehicle, there is the possibility that the other vehicle may move in the same direction as the own vehicle in order to attempt to avoid collision with the own vehicle manually or by collision avoidance process in the same manner as the own vehicle. In this case, even if the own vehicle performs collision avoidance process, the possibility of a collision cannot be reduced.

SUMMARY

The present disclosure provides a collision avoidance apparatus that uses the technology for reducing the possibility of a collision between the own vehicle and an object around the own vehicle as much as possible.

The collision avoidance apparatus of the present disclosure is provided with an object recognition means, a collision determination means and a notification means.

The object recognition means identifies an object around the own vehicle. The collision determination means determines the possibility of a collision between the object identified by the object recognition means and the own vehicle. The notification means provides a notification outside the own vehicle about the movement direction of the own vehicle if the collision determination means determines that the object is a target object having the potential for collision with the own vehicle.

The configuration provides a notification outside the own vehicle about the movement direction of the own vehicle, when there is the possibility of a collision between the own vehicle and the object around the own vehicle, thus, the object around the own vehicle can acquire the movement direction of the own vehicle. Therefore, when the object around the own vehicle is a moving object such as a vehicle, the object around the own vehicle can perform avoidance traveling manually or automatically based on the acquired movement direction of the own vehicle. Hence, the possibility of a collision between the own vehicle and the object around the own vehicle can be reduced as much as possible thereby.

It should be noted that the reference numerals in the parentheses described in the claims indicate the corresponding relationship between the specific means described in the following embodiments, and do not limit the technical scope of the present disclosure.

BRIEF DESCRIPTION OF THE DRAWINGS

In the accompanying drawings:

FIG. 2 is a flowchart showing a collision avoidance process.

DETAILED DESCRIPTION OF THE PREFERRED EMBODIMENTS

Figure 1:
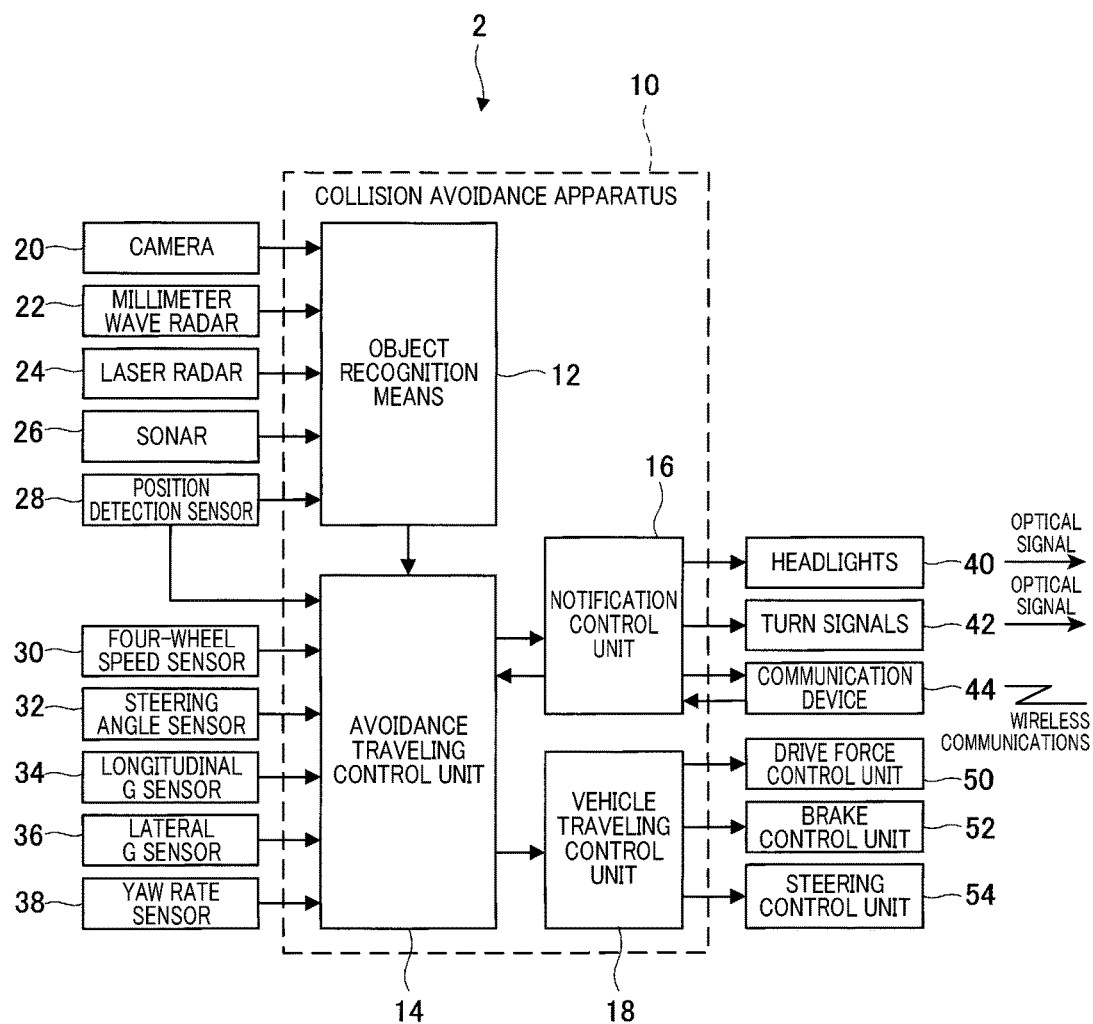
FIG. 1 is a block drawing showing a collision avoidance system according to the present embodiment.

The preferred embodiment to which the present disclosure is applied will be described below with reference to the drawings.

[1. Configuration]

A pre-crash safety system (PCS) 2 (collision avoidance system), shown in FIG. 1, is installed in a vehicle, and if there is the possibility that the own vehicle will collide with an object around the own vehicle, is a system for avoiding the collision by controlling the operation of the brakes and the steering wheel in order to avoid a collision between the own vehicle and the object and mitigating the damage in the event of a collision.

The PCS2 is provided with a collision avoidance apparatus 10, various sensors and various control objects. The collision avoidance apparatus 10 is provided with an object identification unit 12, an avoidance traveling control unit 14, a notification control unit 16 and a vehicle traveling control unit 18. The object identification unit 12, the avoidance traveling control unit 14, the notification control unit 16 and the vehicle traveling control unit 18 are mainly constituted by a well-known microcomputer provided with a CPU, ROM, RAM, and the like respectively.

The object identification unit 12 acquires the information about objects around the own vehicle detected by a camera 20, a millimeter wave radar 22, a laser radar 24, sonar 26 and a position detection sensor 28 as the various sensors.

The object identification unit 12 identifies the type, shape, distance to the own vehicle, the movement speed, the movement direction of the object relative to the own vehicle for the objects in the image based on the image data captured by the camera 20. The object identification unit 12 classifies objects into, for example, vehicles, pedestrians, and types of objects other than vehicles and pedestrians.

Further, based on the image data captured by the camera 20, the object identification unit 12 identifies the movement direction of the target object and a change of speed when the movement direction of the target object changes as a target object having the potential for collision with the own vehicle among the target objects around the own vehicle based on optical signals using, for example, at least one of the headlights and the turn signals from the other vehicle.

The movement direction of the other vehicle is notified by turning on or blinking either the right or left side of at least one of the headlights and the turn signals of the other vehicle. Further, the change of speed when the movement direction changes, for example, in order for the other vehicle to avoid a collision with the own vehicle is notified in accordance with, for example, the blinking rate of at least one of the headlights and the turn signals of the other vehicle. The faster the change of speed of the movement direction, the higher the blinking rate becomes.

The object identification unit 12 identifies the distance between the own vehicle and the object, the relative speed to the own vehicle of the object and the like for the object around the own vehicle based on a reflected wave which the millimeter wave radar 22, the laser radar 24 or the sonar 26 receives.

Further, the object identification unit 12 acquires the position of the own vehicle from the position detection sensor 28. The position detection sensor 28 is a sensor which receives, for example, GPS signals of GPS satellites as the positioning signal of a positioning satellites to detect the own vehicle position.

The avoidance traveling control unit 14 acquires the traveling information of the own vehicle from the position detection sensor 28, a four-wheel speed sensor 30, a steering angle sensor 32, a longitudinal G sensor 34, a lateral G sensor 36 and a yaw rate sensor 38 as the various sensors.

The four-wheel speed sensor 30 detects the respective rotational speed of the four wheels of the own vehicle. The steering angle sensor 32 detects the steering angle of the steering wheel of the own vehicle. The longitudinal G sensor 34 detects the acceleration of the own vehicle. The lateral G sensor 36 detects the acceleration in the lateral direction of the own vehicle. The yaw rate sensor 38 detects the turning angular velocity of the own vehicle.

The avoidance traveling control unit 14 determines the potential (i.e., the possibility of a collision) for a collision with the own vehicle of the object around the own vehicle based on the traveling information of the own vehicle acquired from the position detection sensor 28, the four-wheel speed sensor 30, the steering angle sensor 32, the longitudinal G sensor 34, the lateral G sensor 36 and the yaw rate sensor 38, the identification information which is the information relating to the object around the own vehicle acquired from the object identification unit 12, and the position of the object around the own vehicle, the movement direction and the change of speed of the movement direction acquired from the notification control unit 16 described hereafter.

The avoidance traveling control unit 14 executes avoidance traveling control for avoiding a collision with a target object having the potential for collision with the own vehicle when there is a possibility that the own vehicle will collide with the object around the own vehicle.

The notification control unit 16 notifies the direction (i.e., the avoidance direction or the collision avoidance direction) which the own vehicle avoids as the movement direction of the own vehicle to the outside of the own vehicle by optical signals which used at least one of the headlights 40 and the turn signals 42 which are control objects, when avoidance traveling control for avoiding a collision between the own vehicle and the target object is executed by the avoidance traveling control unit 14.

The notification control unit 16 notifies the movement direction of the own vehicle by turning on or blinking either the right or left side of at least one of the headlights 40 and the turn signals 42 of the own vehicle. When avoiding a collision with the target object, the movement direction of the own vehicle is notified by turning on or blinking the avoidance direction side of at least one of the headlights 40 and the turn signals 42 of the own vehicle.

Furthermore, the notification control unit 16 notifies the change of speed when the movement direction is changed to the avoidance direction in order to avoid a collision between the own vehicle and the other vehicle, for example, by the blinking rate of at least one of the headlights 40 and the turn signals 42.

Further, the notification control unit 16 uses a communication device 44 which is a control object to acquire the movement direction and the change of speed of the movement direction of the own vehicle from the avoidance traveling control unit 14 to notify by transmitting to the outside of the own vehicle.

The communication device 44 is a device for performing, for example, inter-vehicle communication. The notification control unit 16 acquires the own vehicle position detected by the position detection sensor 28 via the avoidance traveling control unit 14, and may use the communication device 44 to transmit and notify the movement direction of the own vehicle together to the outside of the own vehicle.

If the object around the own vehicle is the other vehicle equipped with a communication device for performing inter-vehicle communication, the other vehicle can identify the movement direction and the change of speed of the movement direction of the own vehicle transmitted by the own vehicle based on the information received by the communication device. The notification control unit 16 acquires the movement direction and the change of speed of the movement direction of the other vehicle transmitted by the other vehicle from the communication device 44 as the object around the own vehicle.

The vehicle traveling control unit 18 indicates the amount of control in a drive force control unit 50, a brake control unit 52 and a steering control unit 54 which are control objects based on an indication from the avoidance traveling control unit 14.

The drive force control unit 50 controls the fuel injection amount or the amount of intake air based on the amount of control indicated from the vehicle traveling control unit 18, when an internal combustion engine is provided as a drive source of the own vehicle, and when a motor is provided as a drive source, controls the amount of energization and the like to the motor, thereby controlling the drive force of the own vehicle The brake control unit 52 controls the braking force by the hydraulic pressure of the hydraulic brake and when a motor is provided as the drive source of the own vehicle, controls the braking force by a regenerative brake based on the control amount indicated from the vehicle traveling control unit 18.

The steering control unit 54 controls the amount of energization to the motor which drives the rotation of the steering wheel based on the control amount indicated from the vehicle traveling control unit 18.

[2. Process]

The collision avoidance process executed by the collision avoidance apparatus 10 will be explained based on the flowchart of FIG. 2. The flowchart of FIG. 2 is normally executed.

In the case where there is no target object having the potential for collision with the own vehicle when if the braking force is applied (S400: No), the collision avoidance apparatus 10 terminates this process. In the case where there is a target object having the potential for collision with the own vehicle even if the braking force is applied (S400: Yes), the collision avoidance apparatus 10 determines whether or not the collision avoidance process is executed in the lateral direction (S402).

Collision avoidance in the lateral direction may be carried out by the operation of the steering wheel, or the braking force difference between the left and right brakes, or using both the operation of the steering wheel and the braking force difference between the left and right brakes.

When collision avoidance process is not executed in the lateral direction (S402: No), the collision avoidance apparatus 10 terminates this process. When collision avoidance process is executed in the lateral direction (S402: Yes), the collision avoidance apparatus 10 determines whether or not a target object having the potential for collision with the own vehicle is moving (S404).

When the target object is stationary (S404: No), the collision avoidance apparatus 10 determines the movement direction and the change of speed of the movement direction of the own vehicle in order to avoid a collision with the target object (S406).

When the target object is traveling (S404: Yes), the collision avoidance apparatus 10 determines whether or not the information of the movement direction of the target object and the information of the change of speed for changing the movement direction to the avoidance direction were acquired from a target object such as the other vehicle when the movement direction is changed to the avoidance direction in order that the target object avoids a collision with the own vehicle (S408). The change of speed of the movement direction is expressed by, for example, the rate of change of the steering angle of the steering wheel.

The acquired information relating to the movement direction and the change of speed of the movement direction acquired from the target object may be acquired using the communication device 44 to receive the information transmitted directly from the target object or indirectly transmitted via a control center and the like.

Further, when the target object notifies the information of the movement direction and the information of the change of speed of the movement direction by an optical signal which used at least one of the headlights and the turn signals, the image data of the optical signal captured by the camera 20 may be acquired and analyzed by the object identification unit 12.

When the information of the movement direction of the target object and the information of the change of speed of the movement direction were acquired (S408: Yes), the collision avoidance apparatus 10 determines the movement direction and the change of speed of the movement direction of the own vehicle in order to avoid collision with the target object based on the acquisition information relating to the movement direction and the change of speed of the movement direction acquired from the target object (S410), and the process proceeds to S414.

In S410, when the movement direction of the target object is toward the avoidance direction of the own vehicle for avoiding a collision with the target object, the collision avoidance apparatus 10 ceases to make the own vehicle avoid the avoidance direction. In this case, the movement direction of the own vehicle to be notified becomes the movement direction prior to changing to the avoidance direction.

When the information of the movement direction and the information relating to the change of speed of the movement direction was not acquired from the target object (S408: No), the collision avoidance apparatus 10 determines the movement direction and the change of speed of the movement direction of the own vehicle (S412) in order to avoid a collision with the target object based on the movement direction of the target object and the change of speed of the movement direction detected by various sensors such as a camera 20, a millimeter wave radar 22, a laser radar 24, and a sonar 26, and the process proceeds to S414.

The collision avoidance apparatus 10 determines the amount of control for the drive force control unit 50, the brake control unit 52 and the steering control unit 54 based on the movement direction and the change of speed of the movement direction of the own vehicle determined in S406, S410, and S412.

In S414, the collision avoidance apparatus 10 notifies the movement direction of the own vehicle determined by S410 or S412, and when executing avoidance traveling control in order to avoid a collision with the target object, the change of speed for changing the movement direction to the avoidance direction and the position and speed of the own vehicle as the traveling information of the own vehicle are notified to the target object by an optical signal using at least one of the headlights 40 and the turn signals 42, and wireless communication using the communication device 44.

When using the communication device 44, the traveling information of the own vehicle may be directly transmitted from the own vehicle or indirectly from the own vehicle to the target object via the control center and the like.

In the present embodiment, the movement direction and the change of speed of the movement direction of the own vehicle and the position and speed of the own vehicle as the traveling information of the own vehicle are notified to the target object by communication using the communication device 44 and optical signals using the headlights 40 and the turn signals 42.

However, in order to avoid a collision with the target object when the movement direction of the own vehicle cannot be changed due to slipping and the like in the determined movement direction, in S414, the collision avoidance apparatus 10 notifies that there is a state in which it is not possible to move in the direction for avoiding a collision, and sets the slipping direction as the movement direction.

[3. Effect]

The following effects can be obtained by the aforementioned embodiment.

(1) Even when the braking force was applied, when there is the potential of a collision between the object around the own vehicle and the own vehicle, the movement direction for avoiding the collision is notified to the outside of the own vehicle. Therefore, it is possible for the target object having the risk of collision to acquire the movement direction which was notified. Therefore, the target object, for example, can travel in a different direction than the acquired movement direction in order to avoid a collision when moving toward the acquired movement direction, thus, the potential for a collision between the own vehicle and the object around the own vehicle can be reduced as much as possible.

(2) When using the optical signal of the headlights 40 and the turn signals 42, and even when the target object is not equipped with the communication device, the movement direction of the own vehicle can be notified to the target object. The target object identifies the movement direction using the image data captured by the camera, or the driver identifies the movement direction visually.

(3) Even if a target object having the potential for collision with the own vehicle moves to a different direction than the movement direction of the own vehicle, the movement direction and the change of speed of the movement direction of the own vehicle is notified, thus, the driver of the target object can verify that an incoming vehicle is traveling in the direction for avoiding a collision.

[4. Other embodiments]

(1) The notification of the movement direction for avoiding a collision with a target object may use any of the millimeter wave radar 22, the laser radar 24, or the sonar 26 instead of the headlights 40, the turn signals 42 and the communication device 44. In this case, the movement direction and the change of speed of the movement direction of the own vehicle are notified by a predetermined notification signal.

(2) The collision avoidance apparatus 10 does not determine the movement direction and the change of speed of the movement direction of the own vehicle in order to avoid a collision with the target object, but in order to avoid a collision with the target object, the steering angle sensor 32 detects the steering angle of the steering wheel operated by a driver and may notify the movement direction and the change of speed of the movement direction of the own vehicle to be identified based on the detection signal.

(3) When a target object having the potential for collision with the own vehicle is traveling in a different direction than the movement direction of the own vehicle, the collision avoidance apparatus 10 does not have to notify the movement direction and the change of speed of the movement direction of the own vehicle.

(4) Among the movement direction and the change of speed of the movement direction of the own vehicle, only the movement direction may be notified.

(5) A function provided by a single constituent element according to the above-described embodiment may be dispersed as a plurality of constituent elements, or a function provided by a plurality of constituent elements may be integrated into a single constituent element. Further, at least a part of the configuration according to the above-described embodiment may be replaced with a known configuration having similar functions. Further, a part of the configuration according to the above-described embodiment may be omitted. However, any embodiment included in the technical concept specified only by the wordings of the scope of claims is an embodiment of the present disclosure.

(6) Other than the abovementioned collision avoidance apparatus 10, a collision avoidance system having the collision avoidance apparatus 10 as a component, a collision avoidance program which makes a computer function as collision avoidance apparatus 10, a recording medium on which the collision avoidance program is recorded, a collision avoidance method and the like can also be realized with the present disclosure in numerous forms.

REFERENCE SIGNS LIST

2: collision avoidance system, 10: collision avoidance apparatus, 12: object identification unit (object recognition means and movement direction acquisition means), 14: avoidance traveling control unit (avoidance traveling control means), 16: notification control unit (notification means and movement direction acquisition means), 18: vehicle traveling control unit (avoidance traveling control means), 40: headlights, 42: turn signals, 44: communication device

The invention claimed is:

1. A collision avoidance apparatus comprising:
   object recognition means for identifying an object around an own vehicle;
   collision determination means for determining the possibility of a collision between the object to be identified by the object recognition means and the own vehicle;
   notification means for notifying outside of the own vehicle about the movement direction of the vehicle if the collision determination means determines that a target object is an object having the potential for collision with the own vehicle; and
   avoidance traveling control means for controlling a traveling of the own vehicle to avoid a collision with the target object such that the movement direction of the own vehicle is changed, wherein
   the notification means is configured to notify that the own vehicle has set an avoidance direction for avoiding the target object as the movement direction of the own vehicle by an avoidance traveling control executed by the avoidance traveling control means, and
   in response to the own vehicle not being able to change the movement direction of the own vehicle to the avoidance direction, the notification means notifies that the movement direction of the own vehicle cannot change.

2. The collision avoidance apparatus according to claim 1, wherein
   the apparatus includes movement direction acquisition means for acquiring the movement direction of the target object; and
   when the movement direction of the target object to be acquired by the movement direction acquisition means is towards the avoidance direction, the avoidance traveling control means ceases to make the own vehicle move to the avoidance direction.

3. The collision avoidance apparatus according to claim 1, wherein
   the notification means is configured to notify the movement direction of the own vehicle by an optical signal using at least one of headlights and turn signals.

4. The collision avoidance apparatus according to claim 3, wherein
   the optical signal is a signal identified by image data captured by a camera.

5. The collision avoidance apparatus according to claim 3, wherein
   when the own vehicle moves in either of the left or right avoidance direction so as to avoid a collision with the target object, the notification means uses at least one of the headlights and the turn signals on the side in the avoidance direction to notify the movement direction of the own vehicle.

6. The collision avoidance apparatus according to claim 5, wherein
   the notification means is configured to set the blinking rate of at least one of the headlights and the turn signals on the side in the avoidance direction in accordance with a change of speed at which the own vehicle changes the movement direction of the own vehicle in either of the left and right avoidance directions.

7. The collision avoidance apparatus according to claim 1, wherein
   the notification means is configured to notify the movement direction of the own vehicle by wireless communication.

8. The collision avoidance apparatus according to claim 1, wherein the notification means is configured to notify the movement direction of the own vehicle when the target object is traveling, and does not notify the movement direction of the own vehicle when the target object is stationary.

9. The collision avoidance apparatus according to claim 1, wherein the notification means is configured to notify the movement direction of the own vehicle when the target object is moving toward the movement direction of the own vehicle, and does not notify the movement direction of the own vehicle when the target object is moving toward a different direction than the movement direction of the own vehicle.

10. The collision avoidance apparatus according to claim 2, wherein the movement direction acquisition means is configured to acquire the movement direction of the target object.

11. A collision avoidance method comprising:

identifying an object around an own vehicle;

determining the possibility of a collision between the object and the own vehicle;

notifying outside of the own vehicle about the movement direction of the vehicle if determined that a target object is an object having the potential for collision with the own vehicle; and controlling a traveling of the own vehicle to avoid a collision with the target object such that the movement direction of the own vehicle is changed, wherein the outside of the own vehicle is notified that the own vehicle has set an avoidance direction for avoiding the target object as the movement direction of the own vehicle by executing an avoidance traveling control, and in response to the own vehicle not being able to change the movement direction of the own vehicle to the avoidance direction, the outside of the own vehicle is notified that the movement direction of the own vehicle cannot change.

12. A collision avoidance system comprising:

a central processor;

a non-transitory computer-readable storage medium; and a set of computer-executable instructions stored on the computer-readable storage medium that cause the central processor to implement:

identifying an object around an own vehicle;

determining the possibility of a collision between the object and the own vehicle;

notifying outside of the own vehicle about the movement direction of the vehicle if determined that a target object is an object having the potential for collision with the own vehicle; and controlling a traveling of the own vehicle to avoid a collision with the target object such that the movement direction of the own vehicle is changed, wherein the outside of the own vehicle is notified that the own vehicle has set an avoidance direction for avoiding the target object as the movement direction of the own vehicle by executing an avoidance traveling control, and in response to the own vehicle not being able to change the movement direction of the own vehicle to the avoidance direction, the outside of the own vehicle is notified that the movement direction of the own vehicle cannot change.

* * * * *